United States Patent [19]

Williams et al.

[11] 4,036,663

[45] July 19, 1977

[54] INORGANIC PIGMENTS AND METHODS FOR PRODUCING THE PIGMENTS AND AQUEOUS SLURRIES THEREOF

[75] Inventors: Lloyd E. Williams, Bel Air; Guillermo A. Almagro, Aberdeen, both of Md.

[73] Assignee: J. M. Huber Corporation, Locust, N.J.

[21] Appl. No.: 613,581

[22] Filed: Sept. 15, 1975

Related U.S. Application Data

[62] Division of Ser. No. 198,020, Nov. 5, 1971, abandoned.

[51] Int. Cl.² ................ C08J 3/00; C08K 9/02; C09C 1/00; C08K 3/00
[52] U.S. Cl. ................ 106/308 B; 106/288 B; 106/309; 106/306
[58] Field of Search ............. 106/288 B, 308 B, 309, 106/306

[56] References Cited

U.S. PATENT DOCUMENTS

| | | | |
|---|---|---|---|
| 2,260,871 | 10/1941 | Sawyer | 106/309 X |
| 2,786,777 | 3/1957 | Allen | 106/306 |
| 3,000,749 | 9/1961 | Bachmann et al. | 106/309 X |
| 3,009,827 | 11/1961 | Deuel et al. | 106/309 X |
| 3,291,626 | 12/1966 | Shurling et al. | 106/288 B X |
| 3,790,396 | 2/1974 | Fitton | 106/308 B X |

*Primary Examiner*—J. Poer
*Assistant Examiner*—William G. Wright
*Attorney, Agent, or Firm*—Robert L. Price; Harold H. Flanders

[57] ABSTRACT

Finely divided inorganic pigments having improved wetting characteristics and which may be rapidly dispersed in an aqueous medium, and methods for preparing same, are disclosed. The improved pigments comprise blends or mixtures of inorganic pigment particulates, such as calcium silicate, hydrated silica, aluminum hydrates and sodium alumino silicates, etc. and a soluble deliquescent salt, such as the sulfates, nitrates and chlorides of aluminum and other metals. The pigments are produced by dry blending mixtures of the inorganic pigment and the soluble deliquescent salt. Conventional soaking periods on the order of 12 to 24 hours are reduced to less than 2 hours by the use of the improved pigments of the invention.

4 Claims, No Drawings

INORGANIC PIGMENTS AND METHODS FOR PRODUCING THE PIGMENTS AND AQUEOUS SLURRIES THEREOF

This is a division of application Ser. No. 198,020 filed Nov. 5, 1971 now abandoned.

BACKGROUND OF THE INVENTION

1. Field of the Invention

The present invention relates to inorganic pigments, and more particularly to the production of finely divided inorganic pigments having improved wetting characteristics.

2. Description of the Prior Art

As known in the art finely divided inorganic pigments, such as hydrated silicas, alumina, calcium silicates, sodium alumino silicates and the like are used in many and widely varying applications. Such pigments are used, for example, as in the manufacture of paper, as reinforcing agents in rubber, as fillers in paints, in adhesives, etc.

For many years such pigments have been used by the ultimate consumer or processor in the form of an aqueous slurry or dispersion of the pigments. In recent years, significant innovations have been developed for stabilizing aqueous slurries of inorganic pigments and to prevent the pigments from settling and forming a cake or heel in the bottom of the storage tank, tank car or in other equipment employed by the processor. An example of such a technique for stabilizing aqueous slurries of inorganic pigments is disclosed in U.S. Pat. No. 3,291,626.

A further and very difficult problem remains however. This lies in the formation of the aqueous pigment slurry itself. In this regard, the general procedure for preparing a pigment slurry is to pump a given amount of water into the tank car, tank, or other vessel which contains a given weight of the pigment to make up a slurry having a specific concentration of solids. Because of practical and economical considerations pigment slurries generally have a solids content on the order of 10 to 50% by weight. To increase the wetting and the dispersion of the pigment into the aqueous medium prior art workers have used water at a relatively high temperature and thereafter allowed the slurry or resulting mixture to soak until the pigment is thoroughly dispersed. In addition, the mixture or dispersion has been agitated by bubbling air, or gas, through spargers or the like built into the tank car, tank or other vessel.

However, it has been found that even when hot water is employed, long soaking periods on the order of from about 12 to 24 hours are required. This is, of course, highly uneconomical and impractical. It has also been found that agitation of the mixture has little effect and is clearly not an adequate solution to the problem.

To improve the wetting of inorganic pigments, it has also been proposed to increase the moisture content of the pigment itself prior to its introduction or admixture with the aqueous medium. While this step improves wetting, it has been found that dispersion is still poor and that long soak times, as discussed above, are still required.

SUMMARY OF THE INVENTION

In summary, the present invention relates to the production of easily wetted inorganic pigments and to methods for preparing the pigments and slurries thereof. The products and methods of the invention overcome, and are not subject to, the above discussed disadvantages of the prior art. In accordance with the present invention, the unique pigment compositions are readily dispersed into the aqueous medium requiring a soak time of less than 2 hours. In its broadest aspects, the invention is based on the unexpected discovery that inorganic pigments can be readily wetted and dispersed in an aqueous medium if the pigments are admixed or blended with certain deliquescent salts, preferably the sulfates, nitrates, chlorides, and acetates of aluminum. As indicated the thus treated inorganic pigments are rapidly wetted, even with cold water. In addition, it has been discovered that the thus treated or blended inorganic pigments, when dispersed to form an aqueous slurry, are unique to the extent that slurries thereof contain the dispersed pigments in a state such that the latter remain in uniform suspension so that the slurry can be readily pumped or removed from a tank, tank car or the like.

It is accordingly a general object of the present invention to provide an unique inorganic pigment, and methods for preparing said pigment.

A further and more particular object is to provide an improved inorganic pigment and a method for preparing same, said pigment having the characteristic of being rapidly wetted and dispersed in an aqueous medium.

Yet a further object is to provide a method for wetting and dispersing finely divided inorganic pigments in an aqueous medium in a highly efficient, rapid and economical manner.

Still another object is to provide an improved method for forming a rapidly wetted finely divided inorganic pigment.

The manner in which the foregoing and other objects are achieved in accordance with the present invention will be better understood in view of the following detailed description which discloses particularly advantageous method and composition embodiments for illustrative purposes.

DESCRIPTION OF PREFERRED EMBODIMENT(S)

As discussed above, the present invention relates to the improved wetting and dispersion of inorganic pigments in an aqueous medium. The invention is based, in part, on the discovery that inorganic pigments having improved wetting characteristics can be produced by contacting or coating such pigments with certain soluble deliquescent salts. As to be discussed in more detail hereinafter, the salt is dry blended with the pigment, i.e., by simply mixing or blending solid granules or dry particulates of the salt and pigment. In addition to the improved wetting characteristics of the thus treated pigment, it has also been discovered that the addition or treatment of the pigment with the salt not only improves the wetting characteristics but also enhances the dispersion or stabilization of aqueous slurries thus formed.

In general the present invention can be practiced with a wide variety of finely divided inorganic pigments including but not limited to, hydrated silicas, calcium silicates, aluminum silicates, alumina, sodium alumino silicates and other fine particulates that are insoluble in an aqueous medium. In addition it has been found that particularly advantageous results are obtained with certain inorganic pigments. These include hydrated silica, hydrated alumina and synthetic sodium aluminum silicate pigments of submicron size. Specific examples of the synthetic sodium alumino silicates are those manufactured and sold under the trademark "Zeolex" by J. M. Huber Corporation. In general "Zeolex" pigments are precipitated amorphous materials composed of particles having ultimate sizes of only a few hundredths of a micron in diameter.

Turning now to more specific details of the invention, the soluble deliquescent salt that may be employed in the present invention include the sulfates, nitrates, chlorides and acetates of aluminum, magnesium, zinc or sodium. It has been found that particularly advantageous results are obtained when using the aluminum salts, i.e., aluminum sulfate, aluminum nitrate, aluminum chloride and aluminum acetate. Aluminum sulfate is particularly advantageous and is the preferred aluminum salt. In general, the magnesium salts, including magnesium sulfate, magnesium chloride, magnesium nitrate and magnesium acetate, though less effective than the aluminum salts serve to significantly improve the wetting characteristics of the inorganic pigments and thus same may also be advantageously employed in the present invention. Soluble salts other than those noted above, such as calcium acetate, the soluble phosphate salts and the like may also be employed. However, such salts do not improve the wetting and dispersion characteristics of the inorganic pigments in the same manner or to the same extent as the aforementioned aluminum and magnesium salts.

The deliquescent salt may be added to, or blended with, the inorganic pigment in an amount in the range of from about 0.1 to 15 percent by weight, based on the dry weight of the pigment. In general, an amount of the salt less than 0.10 percent by weight is ineffective, whereas amounts greater than 15 percent do not further enhance the wettability or other characteristics of the pigment. Preferably the salt is coated on or blended with the inorganic pigment in the amount in the range of from about 0.1 to 3 percent by weight, based on the dry weight of the pigment. As discussed above, the deliquescent salt, e.g., aluminum sulfate, is dry blended with the pigment such that the salt is uniformly dispersed within and forms a thin coating on the pigment. Any suitable mixing or milling apparatus may be employed.

In this regard, and as indicated above, particularly advantageous results are obtained in accordance with the present invention when treating finely divided sodium alumino silicate pigments sold under the trademark "Zeolex". As disclosed in U.S. Pat. Nos. 2,739,073 and 2,848,346, these pigments are prepared by comingling and reacting dilute solutions of an alkali silicate and an aluminum salt, such as aluminum sulfate. Upon completion of the reaction procedure, the precipitated pigment is separated from the reaction liquid, as by filtration, washed with water to remove water soluble salts and the like and thereafter dried.

As an illustration of the difficult problem solved by the present invention, experience has shown that in attempting to form slurries of the aforementioned synthetic sodium alumino silicate pigments the introduction of the water in the tank car or tank results in large masses of the silicate pigment in which only the surface of the pigment is wetted. In other words the "core" of the pigment is dry. The diffusion of the water into the core requires a considerable length of time for complete wetting, i.e., a soak time on the order of up to 24 hours. In addition, after the pigment is wetted, a thick slurry is formed which does not disperse readily. Agitation or application of shear, such as by bubbling air into the mass or mixture, disperses the slurry only very slowly.

In accordance with the invention such sodium alumino silicate pigments, when coated or blended with the soluble deliquescent salt as disclosed herein, are rapidly wetted, even with cold water. In addition excellent stabilization of the slurry is obtained. Experiments have established that the soaking period or time is reduced from about 24 hours to less than 1 hour. In addition, because of the superior dispersion properties of the resulting slurry, tank cars transporting the pigment may be quickly and easily cleaned.

The following examples will serve to further illustrate the present invention but are expressly not intended to limit it thereto.

EXAMPLE 1

938 lbs. of a finely divided precipitated sodium aluminum silicate pigment (Zeolex) was homogeneously blended with 32 lbs. of aluminum sulfate in a mechanical mill. A mechanical feeder was employed to regulate the amount of the aluminum sulfate fed or added to the pigment. The resulting pigment, which was found to have a thin film or coating of the sulfate salt, was then charged to a tank car to which water was added at a rate of 200 gpm until a 30 percent solids slurry was obtained. After soaking for one hour the pigment was found to be uniformly wetted, dispersed and suspended in the aqueous medium.

EXAMPLE 2

The procedure of Example 1 was repeated except that a precipitated hydrated silica of very fine particle size was substituted for the Zeolex pigment. The tests results were the same as Example 1.

EXAMPLE 3

The procedure of Example 1 was repeated except that a fine particle-size hydrated alumina was substituted for the Zeolex pigment. The tests results were the same as Example 1.

EXAMPLE 4

The procedure of Example 1 was repeated except that in a series of tests, aluminum nitrate, aluminum chloride and aluminum acetate were substituted for the aluminum sulfate. The tests results were substantially the same as Example 1.

EXAMPLE 5

The general procedure of Examples 1 and 4 were repeated except that in a series of tests, magnesium sulfate, magnesium nitrate, magnesium chloride and magnesium acetate were substituted for the aluminum salts of Examples 1 and 4. The results of these tests established that the magnesium salts improved the wetting characteristics of the pigment. The pigment was uniformly wetted in about 2 hours as compared to 24 hours required for untreated pigments.

EXAMPLE 6

The general procedures of Examples 1-5 were repeated except that the percentage of the deliquescent salt added to the pigment was varied over a range of from 0.1 to 15 percent by weight of the pigment (by increments of 1.0%). Increased wetting of the pigments was obtained in these tests. However, these tests further established that maximum viscosities of the resulting slurries were obtained when the salt was added in an amount in the range of from 1 to 3%. At levels above 3% the viscosity decreased. Also the amount of salt added affected the pH of the slurry. Optimum results were obtained when the viscosity was maximum and the pH of the resulting slurry was in the range of from about 6.5 to 7.5.

EXAMPLE 7

The general procedures of Examples 1-6 were repeated except that calcium nitrate, calcium chloride, calcium acetate, sodium sulfate, sodium nitrate, sodium chloride and tetra sodium polyphosphate were substituted for the aluminum and magnesium salts of Examples 1-6. The pigments treated in this Example were wetted in about 3.5 to 5.0 hours as compared to 24 hours required for untreated pigments. The results of this Example established that the salts employed in this test improved the wetting and dispersion characteristics of the pigments but not in the same manner or to the same extent as the aluminum and magnesium salts of Examples 1-6.

What is claimed is:

1. In a method for producing an aqueous dispersion of finely divided inorganic pigments in an aqueous medium to form aqueous dispersions thereof, the improved method comprising the steps of (1) intimately dry blending finely divided particulates of an inorganic pigment selected from the group consisting of hydrated silicas, calcium silicates, aluminum silicates, alumina, and sodium aluminosilicates, with from about 0.1 to 15.0 percent by weight based on the weight of said pigment of a soluble deliquescent salt selected from the group consisting of aluminum sulfate, aluminum nitrate, aluminum chloride, and aluminum acetate, to thereby form a substantially uniform solids mixture of said deliquescent salt in said pigment, and (2) dispersing said solids mixture into an aqueous medium to form a slurry of said mixture having a concentration on the order of about 10 to 50 weight percent of the solids mixture in the aqueous medium, said resulting dispersion being characterized by improved stability and remaining in uniform suspension over extended periods of time.

2. A method in accordance with claim 1 wherein said deliquescent salt is blended with said pigment in an amount in the range from about 0.1 to 3 percent by weight based on the dry weight of said pigment.

3. A method according to claim 2 wherein said inorganic pigment is selected from the group consisting of finely divided precipitated sodium aluminosilicate, hydrated silica and alumina.

4. A method according to claim 1 wherein said soluble deliquescent salt is aluminum sulfate and said inorganic pigment is finely divided precipitated sodium aluminosilicate.

* * * * *